Jan. 17, 1956 C. R. DOCKUM 2,731,264

PROJECTOR SYSTEM FOR COMPOSING IN COLOR AND FORM

Filed Nov. 20, 1952 5 Sheets-Sheet 1

CHARLES R. DOCKUM,
INVENTOR.

BY [signature]

ATTORNEY.

Jan. 17, 1956 C. R. DOCKUM 2,731,264

PROJECTOR SYSTEM FOR COMPOSING IN COLOR AND FORM

Filed Nov. 20, 1952 5 Sheets-Sheet 2

CHARLES R. DOCKUM,
INVENTOR.

BY

ATTORNEY.

CHARLES R. DOCKUM,
INVENTOR.
BY [signature]
ATTORNEY.

Jan. 17, 1956 C. R. DOCKUM 2,731,264

PROJECTOR SYSTEM FOR COMPOSING IN COLOR AND FORM

Filed Nov. 20, 1952 5 Sheets-Sheet 4

CHARLES R. DOCKUM
INVENTOR.

BY [signature]

ATTORNEY.

CHARLES R. DOCKUM,
INVENTOR.

BY [signature]

ATTORNEY.

United States Patent Office

2,731,264

Patented Jan. 17, 1956

2,731,264

PROJECTOR SYSTEM FOR COMPOSING IN COLOR AND FORM

Charles R. Dockum, Pasadena, Calif.

Application November 20, 1952, Serial No. 321,700

15 Claims. (Cl. 272—10)

This invention relates to a means for expressing and creating upon a screen compositions of flowing, mobile, continuously variant forms in color. The invention contemplates a projection system capable of affording maximum flexibility in the selection, relative movement, color and placement of the patterns projected upon a screen so as to provide a means for aesthetically expressing in dynamic manner compositions in color and in form.

Prior systems have been proposed for creating compositions in color. Such prior systems were principally concerned with three different objectives, first, the association of color or color patterns with music, second, the provision of easily changeable varying patterns in color as exemplified by a kaleidoscope, and third, the provision of variant color patterns on a screen.

The systems of the prior art for creating compositions in color were extremely limited in flexibility in the selective control of the color compositions created and in the aesthetic results achieved. They did not afford means for the subtle discrimination in moving color and form essential to the creation of mobile color compositions of imaginative expression so necessary for achieving composition in color and form as a fine art. Prior art systems required a large space in order to provide limited flexibility for color composition.

The primary object of this invention is to design and provide a projector system capable of creating patterns or formations in form and in color so as to make possible color composition as a fine art.

This invention contemplates the projection on a screen of a plurality of controllably movable patterns in color so that patterns moving relative to each other may create interfusion of the lines of the patterns so as to form virtually unlimited new unique patterns in color. The relative movement of the patterns is controlled in such a manner that the projected patterns may be delicately and skillfully blended so as to create unique and unusual mobile color designs.

An object of this invention is to design and provide a projector system wherein a plurality of variously configured patterns may be created upon a screen and be movable in different directions and at different rates of speed, each independently of the other, and having various selected color composition.

Another object of this invention is to design and provide a projector system for the aesthetic expression in color and form wherein a plurality of projector means are compactly arranged for the projection by each of a plurality of variant mobile patterns in color and in form.

Another object of this invention is to design and provide a projection system wherein a plurality of projector means are arranged in a cluster about a common zone whereby the light path of each projector means may be bent or folded at said zone for projection upon a screen with several relatively movable patterns in superimposed relationship.

Another object of this invention is to design and provide a single projector means which is capable of producing a plurality of mobile patterns in color, each pattern being independently controlled in this movement and its intensity of illumination.

A further object of this invention is to design and provide a projector means wherein a plurality of independently movable film strips are provided, each having selected patterns for interfusion on a projection screen with patterns of an adjacent strip.

Still another object of this invention is to design and provide a projector means wherein the several patterns provided by a plurality of film strips may be in selected color or may be controllably changed in color by suitable adjustable composite color filter means.

A still further object of this invention is to design and provide a projector means wherein a tiltable distorting lens assembly is provided in the light beam path whereby the normal contour of the patterns projected may be curved or distorted by controllable means to create unusual and unique smoothly flowable pattern contours.

This invention contemplates a plurality of projector means, each of which may be individually controlled as to intensity of illumination, relative movement of a plurality of patterns provided therewith, and in variant colors.

This invention further contemplates a control means for regulating the relative movement of each pattern, the intensity of illumination of the light beam, the degree of distortion of the mobile patterns and the composition of color so that a composer may skilfully and artistically create mobile color forms for aesthetic expression in color.

It is understood that when the word "color" is used, black and white are included within the meaning of the word as used herein.

Other objects and advantages of this invention will be readily apparent from the following description of the drawings in which is illustrated an exemplary embodiment of this invention.

Generally speaking, this invention contemplates a novel arrangement of a plurality of projector means disposed in a cluster or a partial cluster for projecting a plurality of light beams toward a common intermediate zone for reflection to a screen whereby selected color images or patterns projected by each projector means are cast upon the screen in generally superimposed relation. Each of the projector means includes a plurality of film strips, each provided with selected patterns which may be projected in color by either coloring the selected patterns or by passing the light beam from each projector through color filter means. The movement of each of the film strips is independently controlled so that each strip may be stopped or may be moved at a selected rate of speed. In the exemplary projector means hereinafter described in detail, at least one of the plurality of film strips may be disposed in angular relation to the other of said film strips so as to produce relative movement of a pattern in angular relation to the movement of the pattern of the other film strips. Each projector means also includes a light limiting or iris diaphragm means for regulating the intensity of the light beam. Each projector means also includes an optical system wherein the light beam, after it passes through the film aperture and the frames of the film strip, may be controllably distorted by a tiltable lens assembly so as to create unusual and unique effects in the mobile color pattern which is cast upon the screen. The invention contemplates that the intensity of illumination of the various moving patterns and the color of said patterns as they are projected on the screen may be readily controlled by the composer at a panel control board so as to create aesthetically pleasing compositions in color and form.

Figure 1:
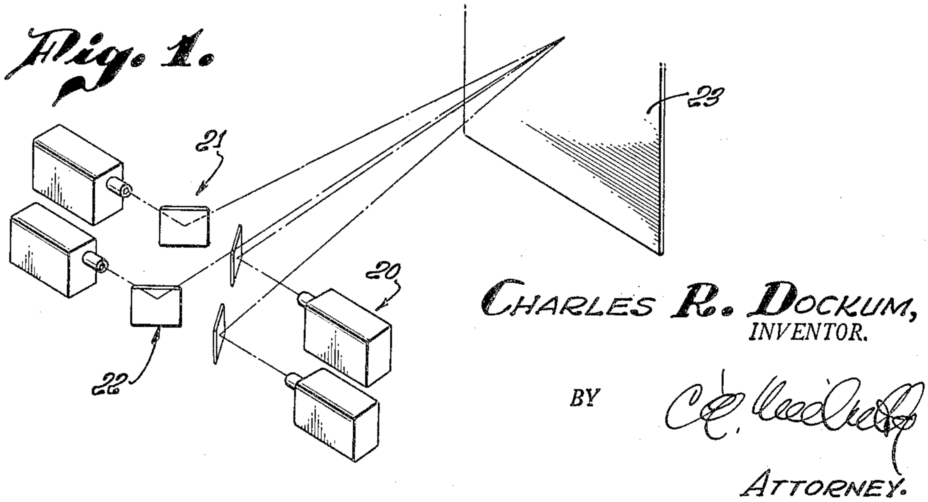
Fig. 1 is a diagrammatic view of a projector system for creating compositions in color and in form embodying this invention.

In Fig. 1 is diagrammatically illustrated a cluster-like arrangement of a plurality of projector means 20 having light beams directed to a common adjacent zone 21 lying in the path of the light beams. Reflector means 22 are provided in said zone for each beam to reflect said beams in convergent paths to a screen 23. The projector means 20 may be suitably supported at different elevations and in laterally offset relation so that the paths of the light beams to the reflector means are separate. Each beam is focused upon the screen to normally define a clear, sharp pattern thereon.

Figure 2:
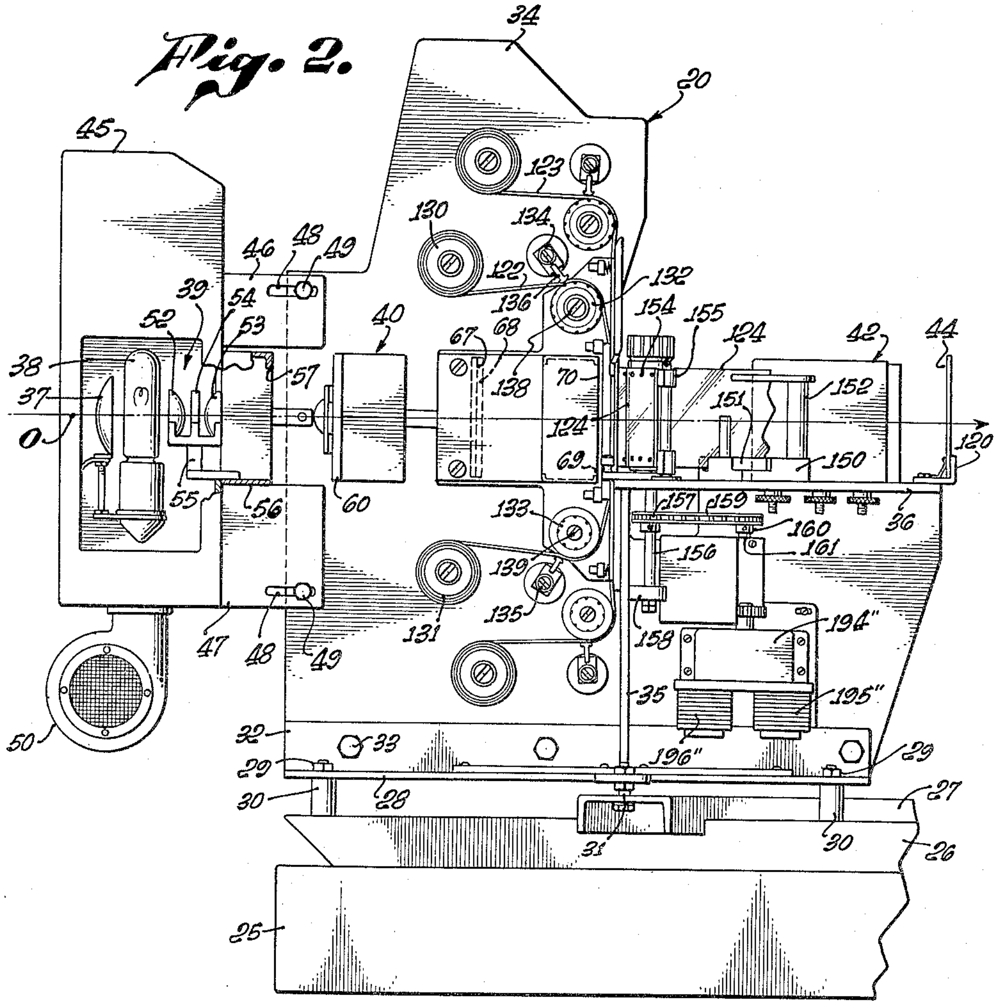
Fig. 2 is a side elevational view of a projector means employed in the projector system shown in Fig. 1.
Figure 3:
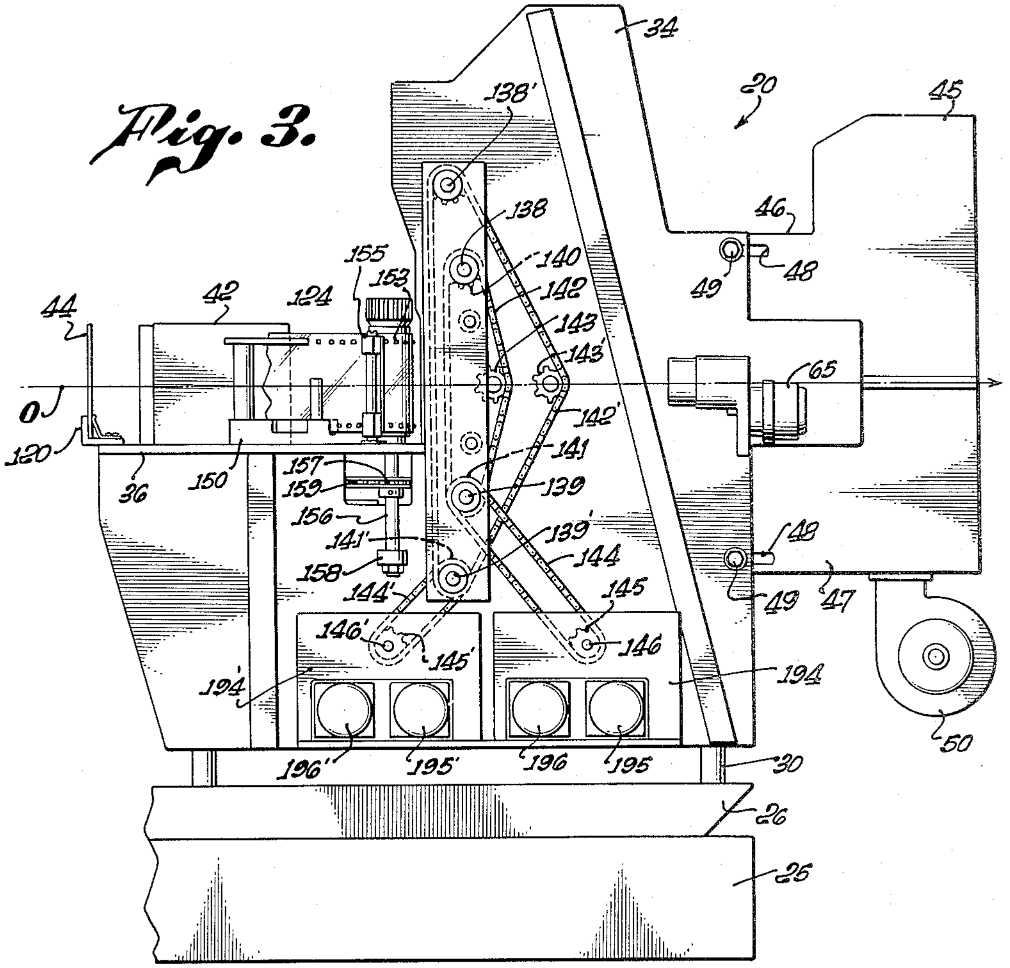
Fig. 3 is an opposite side view of the projector means shown in Fig. 2.
Figure 4:
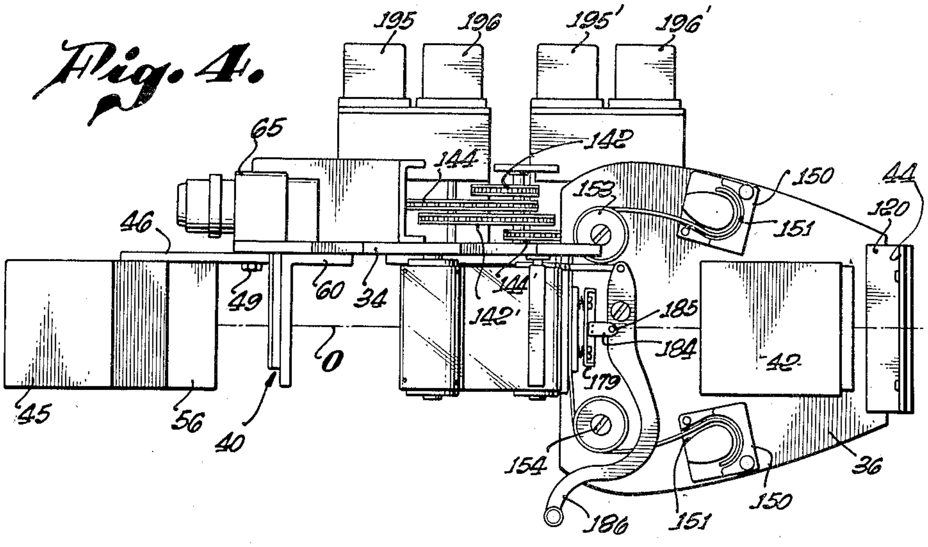
Fig. 4 is a top plan view of the projector means shown in Fig. 2 and Fig. 3.

The construction of a projector means 20 is illustrated in detail in Figs. 2, 3 and 4. Each projector means 20 may be mounted on a supporting table 25. A base for said projector means may include a longitudinally extending base member 26 and a transversely arranged base member 27. The frame structure of the projector means includes a flat, triangular horizontal plate 28 supported at two points by a pair of bolt and nut assemblies 29 and tubular fillers or shim elements 30. At an intermediate corner of the triangular plate 28, an adjustable nut and bolt assembly 31 supports the plate 28 at a third point from the base member 27. The multipoint support serves to permit accurate leveling or alignment of the projector means as desired.

The horizontal plate 28 includes an upstanding flange 32 along one marginal edge thereof to which may be secured, as by spaced bolt and nut assemblies 33, a vertical mounting plate 34 of irregular contour. The mounting plate 34 may be stiffened by an upstanding reinforcing web 35 lying at right angles to plate 34 and secured at its lower portion to the horizontal plate 28. The web 35 is disposed intermediate ends of the mounting plate 34 and supports therewith a horizontal platform 36 seated in a generally rectangular notched-out recess formed in the mounting plate for this purpose.

The mounting plate 34 and the horizontal platform 36 serve to support the various parts of the projector means. These parts are diagrammatically illustrated in Fig. 5 and may comprise a mirror 37, a light source 38, a condensing lens assembly 39, a light limiting or iris diaphragm means 40, an intermediate condensing lens system 41 and a tiltable lens assembly 42. The film plane is indicated by phantom lines 43 and lies between the tiltable lens assembly 42 and the intermediate lens 41. A color filter means 44 may be carried on the platform 36 forwardly of the tiltable lens assembly 42 and may comprise a selected color filter or a composite color filter. It is understood color filter means may be positioned between the light limiting means 40 and the intermediate condensing lens 41 if desired.

In Fig. 2 a hollow lamp housing 45 may be adjustably supported from the rear marginal edges of the mounting plate 34 by means of spaced forwardly directed arms 46 and 47, each having a longitudinally and horizontally disposed slot 48 adapted to accommodate a securing bolt assembly 49. The hollow housing 45 carries at its bottom portion cooling means 50 for the light source 38 carried within the housing. The cooling means 50 may include a well-known arrangement of a blower fan and driving motor adapted to circulate cooling air upwardly into and through the housing 45.

The light source 38 may comprise any well-known projection lamp of suitable light power and is mounted within the housing 45. The mirror 37 is positioned rearwardly of and adjacent to the light source and is provided with a concave face forwardly directed having its center lying virtually on the optical axis "O" of the projector means. Also within the housing may be supported the condensing lens assembly 39 comprising a pair of spaced plano-convex lenses 52 and 53 and an intermediate heat absorbing transparent element 54. The lens assembly 39 may be carried by a suitable supporting member 55 secured to a forwardly extending portion 56 of said housing. The portion 56 is provided with a port 57 aligned with the optical axis "O" of the projector means.

Figures 5, 6, 7, 8:
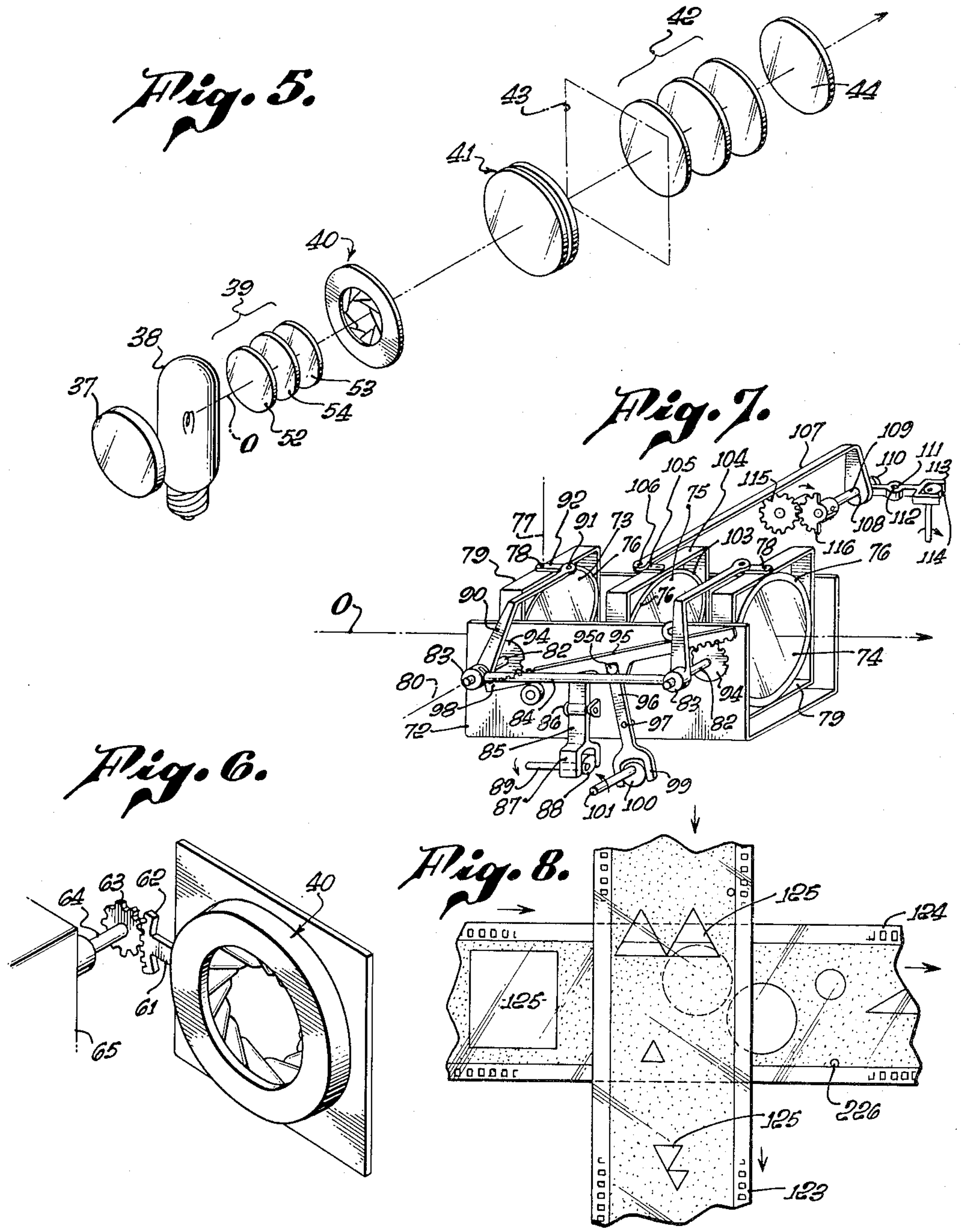
Fig. 5 is a diagrammatic view of the optical elements and arrangement thereof in each projector means.
Fig. 6 is a fragmentary perspective view of the iris or light limiting means employed in the projector means.
Fig. 7 is a perspective view of a tiltable lens assembly employed with the projector means of this invention.
Fig. 8 is a fragmentary diagrammatic view of an exemplary arrangement of film strip means employed with each projector means.

Forwardly of the condensing lens assembly 39 is a light limiting or iris diaphragm means 40 which may be carried by a ported angular bracket 60 secured to the mounting plate in suitable manner. The light limiting means 40 is illustrated in Fig. 6 and may comprise a well-known type of iris diaphragm shutter construction for controlling the amount of light passing through the diaphragm opening. The diaphragm shutter means may be actuated by an arm 61 having at its outer end an arcuate toothed element 62 which is adapted to mesh with a toothed drive pinion gear 63. The gear 63 is carried on a rotatable shaft 64 of a driving motor means generally indicated at 65 mounted on the plate 34 and which is controlled as later described whereby selective rotation of the gear 63 causes the diaphragm shutter means to expand or contract at a selected rate by movement of the actuating arm 61. The light limiting means 40 may be mounted for longitudinal adjustment along the optical axis "O" on the mounting plate by suitable means (not shown) so that the condensing lens assembly 39 and the light limiting means may be spaced apart a proper selected distance.

Forwardly of the light limiting means and carried in an enclosed casing 67 may be a ground glass member 68 lying perpendicularly to the optical axis and a second or intermediate condensing lens 41 spaced forwardly of the ground glass member. The arrangement of the ground glass member, light limiting means, and condensing lens assembly 39 serves to prevent formation of an image of the filament of the light source on the screen when the light limiting means is reduced to a pin point pupil.

A film aperture 69 is provided forwardly of the casing 67 by a ported flat member 70 secured to the mounting plate in any suitable manner adjacent to the rearmost portion of the horizontal platform 36.

The tiltable lens assembly 42 is carried on the horizontal platform 36 forwardly of the film aperture and in alignment with the optical axis "O." An exemplary arrangement of tiltable lenses is shown in detail in Fig. 7. The assembly 42 may be mounted within a suitable supporting enclosure 72, only a portion therefore being shown. Within enclosure 72 is carried outer lenses 73 and 74 and an intermediate lens 75. Each of the lenses 73, 74 and 75 are mounted for tilting movement about a horizontal axis and a vertical axis so as to produce distortion of the light beam passing therethrough.

The outer lenses 73 and 74 may be connected for synchronous oppositely directed corresponding tilting movements. Each lens 73 and 74 is mounted for such pivotal movement in similar manner and for brevity, only one such mounting will be described. Each lens 73 and 74 may be mounted in an annular ring 76 pivoted about a vertical axis 77 by means of radially outwardly projecting pins 78 carried by the ring. The oppositely directed pins 78 are pivoted in a vertically disposed rectangular hollow boxlike frame 79, the top pin 78 projecting through the top member of frame 79.

Each frame 79 is pivotally mounted for movement about a horizontal axis 80. One side of frame 79 may be provided with a pin suitably journaled in the adjacent side wall of enclosure 72 while the other side of frame 79 may be fixedly connected to a rotatable shaft 82 journaled in the adjacent side wall of enclosure 72.

Means for controllably tilting the outer lenses 73 and 74 in oppositely directed movement may comprise an axially slidable pivotally mounted collar 83 carried on an outer extension of each shaft 82. The collars 83 may be provided with annular grooves and may be connected by a cross bar 84 having ends slidably received in said collars, the cross bar 84 having an intermediately positioned depending stem 85 pivotally mounted intermediate its ends as at 86 to the side wall of enclosure 72. The lower end of stem 85 is formed as an inverted U-shaped yoke 87, the jaws of said yoke receiving a cam member 88 eccentrically mounted on a drive shaft 89.

Each collar 83 is fixedly connected to a bent arm 90 which is pivotally connected at its other end as at 91 to a link 92 fixedly connected to a top pin 78. Thus, as the drive shaft 89 is selectively rotated in desired direction, stem 85 and the cross bar are pivoted so that the collars 83 slide axially of the shafts 82 thereby causing the arms 90 to move transversely inwardly or outwardly and thus pivoting the lenses 73 and 74 about vertical axes.

Means for tilting the lenses 73 and 74 about a horizontal axis include a toothed gear 94 secured to each shaft 82. A cross bar 95 connected by sliding pivot **95*a* to a stem 96, pivotally connected as at 97 to the side wall of the enclosure 72 is adapted for rocking motion about the pivotal connection 97. Each end of cross bar 95 includes a toothed portion 98, the toothed portion on one end being downwardly directed for engagement with top teeth of a gear member 94, while at the other end of cross bar 95 the toothed portion 98 is upwardly directed for engagement with bottom teeth of a gear member 94. Thus, rocking movement of the cross bar 95 causes lens 74 to be tilted in one direction while the lens 73** is tilted in the opposite direction.

The stem 96 likewise includes a depending yoke 99 which is adapted to receive a cam member 100 eccentrically mounted on a selectively rotatable drive shaft 101.

The intermediate lens 75 is likewise arranged to be tilted about its horizontal and vertical axes but independently of movement of lenses 73 and 74. The lens 75 is mounted in an annular ring 103 pivoted for movement about a vertical axis to a rectangular box-like frame 104 which is mounted for rotation about a horizontal axis. Tilting movement about a vertical axis is accomplished by a lever and linkage structure similar to that described for lenses 73 and 74. A link 105 is pivotally connected at 106 to one end of an arm 107 which is axially slidable as at 108 on a shaft 109. Axial movement of arm 107 is provided by a slotted collar 110 engaging a lever 111 pivotally mounted intermediate its ends as at 112 to a suitable support. The lever 111 includes yoke 113 adapted to receive an eccentrically mounted cam element 114 whereby the lever 111 may be caused to axially move the arm 107.

The horizontal tilting movement of the lens 75 may be readily accomplished by a drive gear 115 meshed with a toothed gear element 116 fixed to the shaft 109. The shaft 109 extends to the rectangular frame 104 for fixed connection thereto for rotation thereof, this connection not being shown for purposes of clarity in the drawings.

It will thus be readily noted that a tiltable lens assembly provides a means for distorting the light beam by movement of the outer lenses 74 and 73 in mutually opposite directions while the intermediate lens 75 is independently controlled for selected tilting movement thereof. The effect of such distortion is to stretch, narrow, compress, or widen the interfused patterns projected on the screen. The control means for selectively driving the tiltable lens assembly is described in detail hereinafter.

Forwardly of the tiltable lens assembly 42 is mounted a color filter means 44 on platform 36. As illustrated, the color filter means may be held by a suitable holding bracket 120 secured to the forward edge of platform 36. While a single filter means is illustrated, it is understood that the color filter means may be made of a plurality of color components and may be so mounted that different components of color may be selectively rotated into the light beam path so as to provide a means for controlling and selecting various colors on each projector means. The color filter means 44 may be one of several well-known filters adapted to transmit only selected bands of light wavelengths.

Each projector means 20 is arranged to carry a plurality of selectively and continuously movable film strips, each having a selected pattern formed thereon. The plurality of films are so arranged that they traverse the film aperture 69 in closely spaced parallel adjacent planes with the result that the several patterns crossing the aperture at any one time intermesh or interfuse so as to provide new pattern formations of constantly changing shape and size.

The film means on each projector means includes two film strips 122 and 123 adapted to be reciprocally movable along a vertical path past the film aperture, and a horizontal film strip 124 adapted to be reciprocally moved past the film aperture in a horizontal path. In Fig. 8, the arrangement of the film strips in front of the film aperture is diagrammatically illustrated. Each film strip is shown as having a plurality of spaced geometric patterns 125, said patterns being of different contour and configuration according to the design of the composer. The patterns may be spaced or continuous. It will be understood that it may be desirable for certain compositions to angularly position another film strip to provide a diagonally movable film strip carrying a selected pattern for interfusing with the patterns of the other film strips.

Each of the vertically movable film strips 122 and 123 are mounted and driven in substantially similar manner, only one of which will be described and like reference numerals will be used with a prime sign for indicating a like part.

Film strip 122 is provided with usual spaced side perforations and may be carried by and extend between top and bottom take up reels 130 and 131 which are carried by mounting plate 34 above and below optical axis "O." Each of the reels 130 and 131 may include well known automatic tensioning means, so that film strip 122 will be maintained under slight tension in normally wound position on said reels.

The film strip 122 is guided over top and bottom film drive sprocket means 132 and 133, also arranged in vertically spaced relationship above and below the optical axis. Each sprocket means 132 and 133 may be of well known construction and each is provided with a plurality of spaced circumferentially arranged teeth adapted to engage perforations in the film strip in well known manner. Means for providing positive interengagement of the sprocket teeth and perforations in the film strip may be provided by film keeper means 134 and 135 of conventional design carried by the mounting plate adjacent to the respective sprocket means 132 and 133. Each film strip 122 and 123 is guidably positioned for movement in closely spaced parallel planes past the aperture 69 by guide means described hereinafter.

Sprockets 132 and 133 provide a tensioning system for film strip 122 as follows: sprocket 133 is attached rigidly to its shaft 139 (see Fig. 3) while sprocket 132 is connected to its shaft 138 by means of an overriding clutch engagement and loading spring of conventional design. When film 122 is threaded on the sprockets with the keepers 134 and 135 in place, the sprockets are grasped by suitable knobs and turned in opposite directions until the film is properly tensioned. Release of the knobs allows the override clutch to act and hold the film in proper tension between 132 and 133.

The drive means for sprocket means 132 and 133 are best viewed in Fig. 3. The sprocket means 132 and 133 include sidewardly extending shafts 138 and 139 which extend through mounting plate 34 and are adapted to carry sprocket or gear wheels 140 and 141 respectively. The sprocket wheels 140 and 141 are connected by an endless chain 142, said chain 142 also being in engagement with an intermediate sprocket wheel 143 lying between the sprocket wheels 140 and 141 so as to suitably tension the chain 142. The shaft 139 includes a second sprocket wheel (not shown) to which may be attached an endless drive chain 144, the other end of said drive chain being connected with a drive sprocket wheel 145 carried by a drive shaft 146 selectively rotatable as described in detail hereinafter.

The drive means for film strip 123 and the drive sprocket means 132′ and 133′ are generally similar to those described hereinabove and corresponding parts are indicated in Fig. 3 by like reference numerals with prime signs. The drive chain 144′ is connected to a drive shaft 146′ through a sprocket wheel 145′, the shaft 146′ being selectively rotatable.

As best seen in Figs. 2 and 4, the horizontally movable film strip 124 is illustrated as being mounted in a somewhat different manner than the vertical film strips 122 and 123. It is understood, of course, that automatic take-up reels may be employed with the horizontal film strip as described for the vertical film strips 122 and 123.

The film strip 124 is illustrated as having a relatively short length, the ends of which are received in upstanding film retaining and guiding means 150. Each means 150 comprises a base member having a suitably curved groove 151 to facilitate guiding of a portion of a film strip through the means 150. In this example, the ends of film strips 124 may freely extend downwardly along sides of the projector supporting table.

On opposite sides of film aperture 69 are provided upstanding film sprocket means 153 and 154 for the film strip 124, each sprocket means having spaced teeth adapted to interengage with perforations in film strip 124. Adjacent each sprocket means 153 and 154 may be provided an upstanding rotatable film keeper means 155 carried by the platform 36 and similar to keeper means 134 and 135 previously described.

Each of sprocket means 153 and 154 includes a vertical shaft 156 which extends downwardly through platform 36 and which may carry a sprocket wheel 157 below the platform 36. The bottom end of shaft 156 may be supported in a journal 158 secured to mounting plate 34. As best seen in Fig. 2, the sprocket wheels 157 are connected by a sprocket chain 159 which also engage an intermediate sprocket wheel 160 carried on a drive shaft 161 selectively rotatable as hereinafter described.

Figures 9, 10:
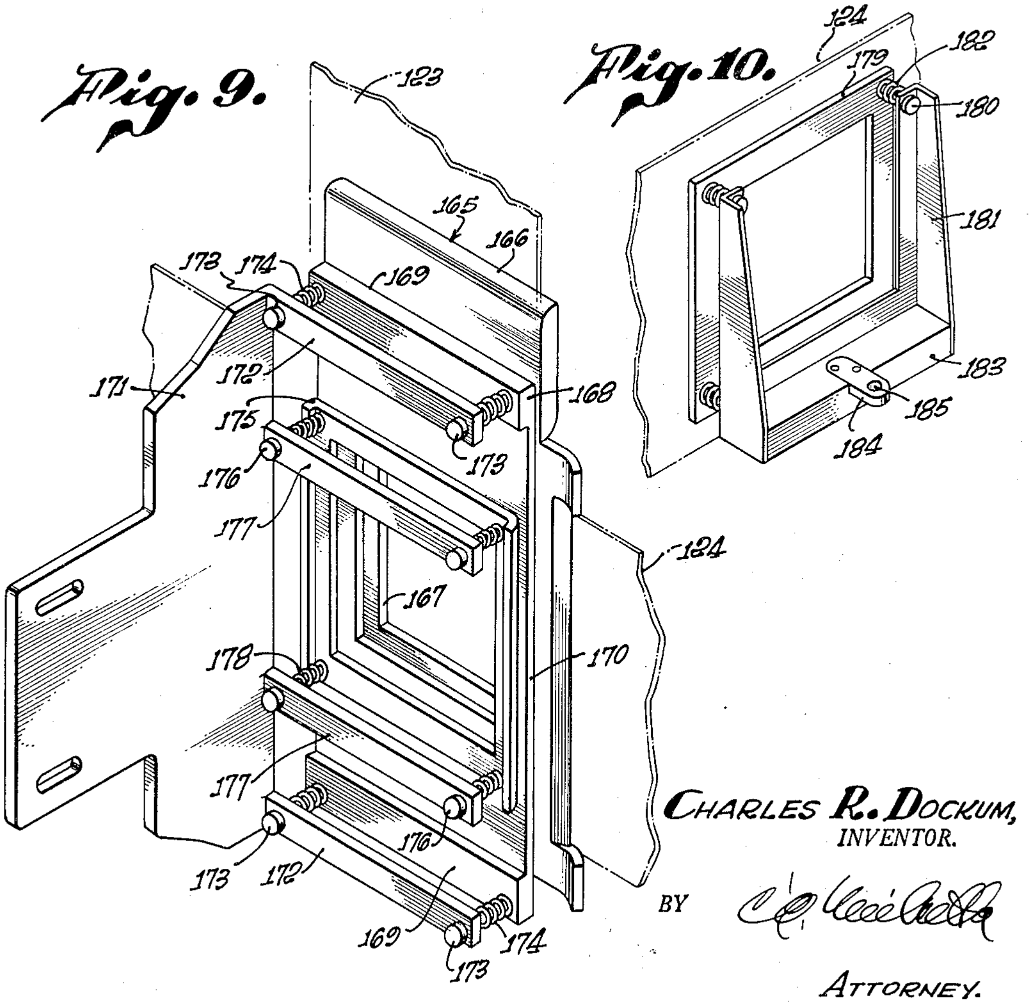
Fig. 9 is an enlarged fragmentary view of film strip guiding and positioning means employed with each projector means.
Fig. 10 is a fragmentary perspective view of the film guide and positioning means for a film strip travelling in a horizontal path.

Means for guiding the three film strips in closely spaced parallel planes adjacent to film aperture 69 is illustrated in Figs. 9 and 10. In Fig. 9, a guide and film positioning means is shown for the two vertically movable film strips 122 and 123. It will be noted that the film strip 123 lies outwardly of film strip 122 and is guided into its vertical film plane by an upstanding smooth surfaced flat member 165 having a smoothly configured curved upper edge portion 166. The member 165 extends downwardly below the film aperture 69 and is provided with an opening 167 corresponding to film aperture 69. Opposed to member 165 and in normally spaced relation therewith is a generally rectangular hollow frame 168 having end rails 169 and side rails 170. The frame 168 is supported from the mounting plate by a rigid support means 171 including a pair of transversely extending arms 172 disposed opposite to end rails 169. The end rails 169 carry spaced pins 173 which extend through aligned ports in the arms 172, and suitable coil springs 174 are sleeved over pins 173 for biasing said frame 168 into desired position.

The film strip 122 is guidably positioned by a similar arrangement disposed between arms 172 of the support means 171, the film 122 lying in a plane inwardly of the film strip 123. The guide means for the film strip 122 likewise includes a hollow, rectangular, rigid frame 175 carrying spaced pins 176 at each corner connected to transversely extending vertically spaced arms 177 carried on said support means 171. Sleeved over pins 176 are coil springs 178 for biasing frame 175 into desired position.

Suitable means for retracting frames 168 and 175 are provided as is well known in the art so as to enlarge the spaces through which the film strips must be threaded. After threading the frames are released and return to normal position so as to positively guide the film strips in a selected film plane.

The film guide and positioning means for the horizontally movable film strip 124 is shown in Fig. 10 and includes a similar structure. A rectangular hollow frame 179 is provided with a pin 180 at each corner connected to a U-shaped frame 181. Spring means 182 are sleeved over each pin 180 for biasing the frame 179 into selected position. The U-shaped member 181 includes a bottom rail 183 having intermediate its ends a lug 184 providing a pivotal connection as at 185 to an actuating lever arm 186 which is adapted to actuate the frame 179 into selected position.

It will thus be readily apparent that each of the three film strips is positively guided and positioned in a selected film plane adjacent to the film aperture 69. The vertically movable film strips 122 and 123 move in planes spaced rearwardly of the plane of the film aperture while the horizontally movable film strip moves in a plane spaced forwardly of the plane of the film aperture.

Control means are provided for regulating the rate of movement of each film strip on each projector means 20, for controlling the pupil size of the light limiting means, for increasing or decreasing the intensity of illumination of the light beam and for tilting the tiltable lens assembly 42. The control means may be manually or automatically operated from a console or control board which may include a unit panel control 190 illustrated in Fig. 12 for each projector means 20.

Figures 11, 12:
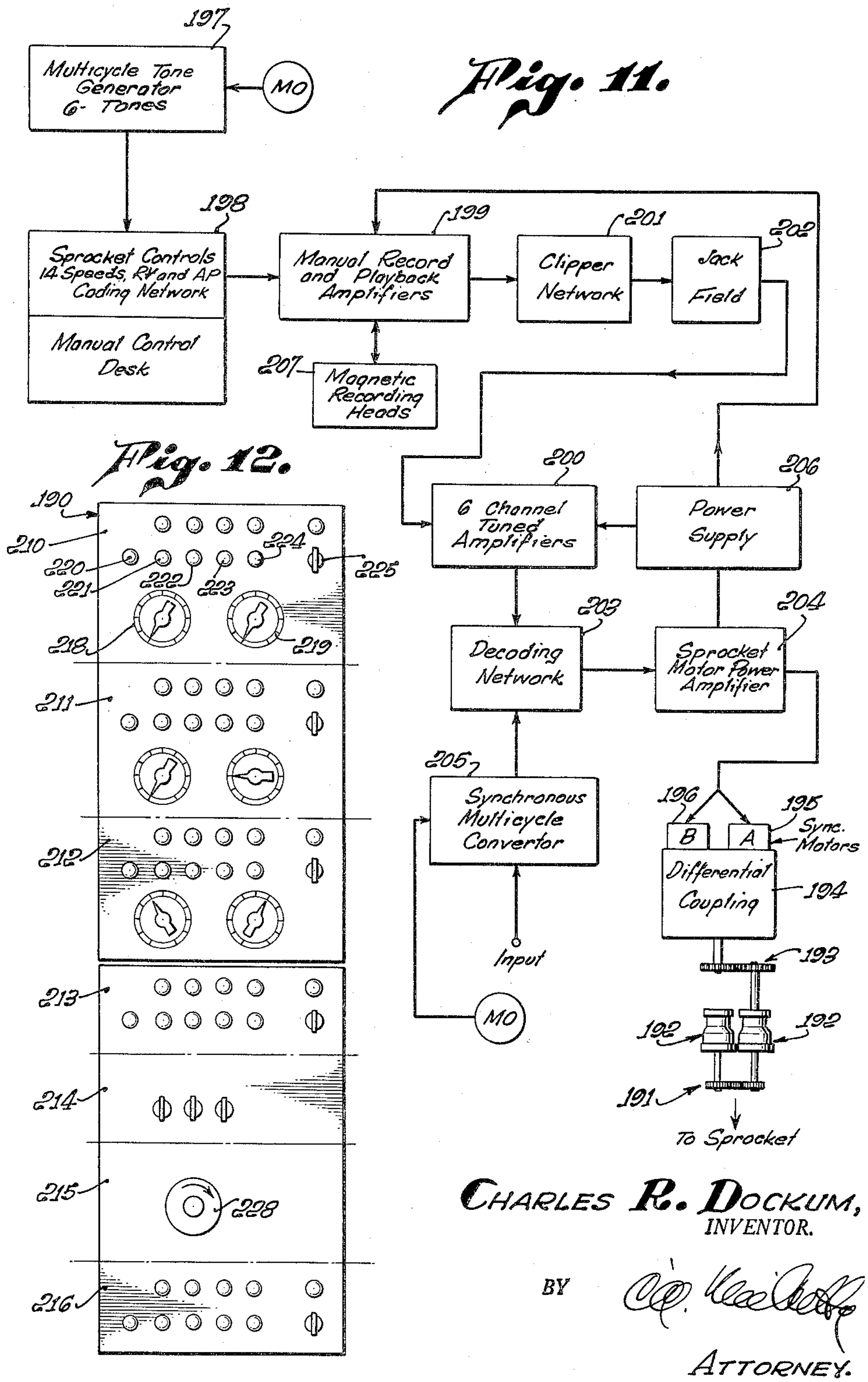
Fig. 11 is a diagrammatic view of an exemplary control means for each projector means.
Fig. 12 is a diagrammatic view of a control panel for each projector means.

The means for controlling the rate of movement of the three film strips on each projector means 20 are substantially similar for each film strip and only one control means will be described as diagrammatically indicated in Fig. 11. It is understood that each of the film strips is selectively and independently movable with respect to the other film strips.

The shaft 146 of the sprocket means for driving film strip 122 is operably associated with a reversing gear means 191 (Fig. 11), the gear means being connected to a pair of reversing clutches 192 which are driven through a suitable gear chain 193 from a differential coupling 194.

The differential coupling is operably connected to a pair of synchronous motors 195 and 196, each motor covering only a portion of the entire speed range for driving the associated film sprockets. For example, the synchronous motor 195 may cover the lower portion of the speed range while the synchronous motor 196 is held immobile by electric braking. Motor 196 may cover the upper portion of the speed range, while motor 195 is electrically braked. Two synchronous motors are employed in order to obtain a wide range of selective speeds from conventional motors as used in this example. The gear means 191 includes opositely rotatable gears, each gear being connected to one of the reversing clutches 192 which are used alternately to provide forward and reverse rotation of the film sprockets.

The exemplary control means is only generally described because it is understood that various other electromagnetic, electro-mechanical or other electrically operated means may be employed to achieve the desired control. In Fig. 11 is illustrated diagrammatically an electro-magnetic system adapted for manual operation or automatic recording operation employing a tone system for selection of the various speeds for movement of the film. The system may include a multi-cycle tone generator 197 capable of producing six tones, four of these tones being used in combination to provide composite tones for representing fourteen different speeds for the film drive sprockets. A fifth tone may be used for reverse speeds of the film movement and a sixth tone may be used for stopping film movement.

The combination of tones is coded in a coding network indicated at 198. Speed selector switches for selecting a desired tone for controlling the speed of the film strip are provided on the control panel 190. A composite tone selected by the selector switches is then applied to the amplifier means generally indicated at 199. The coded amplified selected tone is then sent to a tone amplifier means 200 through a clipper network 201 and a jack field 202. The amplifier means 200 discriminates the composite tone by conventional band pass filters and then applies the discriminated tone to a decoding relay network 203 which is associated with a multicycle converter 205 for determining the speed and direction of the film drive sprocket. The selected frequency from the multicycle conveyor is then amplified by a sprocket motor power amplifier for supplying selected power to the sprocket drive motors 195 and 196. The decoding relays in the decoding network 203 are arranged so as to select frequency and the proper motor for a selected speed as well as the proper clutch. A power supply source for the system is indicated at 206.

The control means includes a system for recording a composition in color and movement and for playing back the composition, that is, selected film movement may be recorded on magnetic tape means, for example, the tape means serving to cause actuation of the film strips through the system generally described above. A time control tape may be employed for regulating the speed of the tape means when operating under the recording and playback system. Magnetic recording means are generally indicated in relation to the system at 207.

The control panel 190 may be normally located in front of the screen so that an operator may view the mobile color forms under composition upon the screen. The control panel 190 may be divided into sections 210, 211, and 212, each of which include control means for regulating the speed of an associated film strip. Below the above-mentioned panel sections are sections 213, 214, 215 and 216; section 213 providing additional control means for the film driving sprockets when a recording operation is being performed. Section 214 includes three switches affording off and on control of preset switches afforded for controlling each of the film strips. Sections 215 and 216 relate to the iris or light limiting means whereby the pupil opening of the iris may be controlled either manually or automatically during recording operations.

Each of the sections associated with the film sprocket speed control are virtually similar and only one will be described. In panel section 210, for example, are provided speed selector switches 218 and 219 which may be manually set for selected film strip speeds. Above the selector switches 218 and 219 are provided a row of preset speed control switches 220, 221, 222, 223 and 224, these preset switches being used for selection of certain speeds when the projector means are being operated by recording means.

Above the preset selector switches are a row of indicator lights to show the energized or nonenergized condition of the preset switches. At one side of panel section 210 may be provided a switch 225 which affords control of an automatic positioning circuit means whereby each strip is brought into predetermined selected position by means of a microswitch energized by means responsive to the position of an index perforation 226 (Fig. 8) in each film strip.

The panel sections 213 and 216 provide control means used in recording functions including play back, erase, release and manual operation. The switch means illustrated in panel section 216 relate to the recording functions with respect to the iris diaphragm means.

The light limiting or iris means 40 is actuated by a conventional servomotor unit which has been generally indicated at 65. This servomotor unit is controlled by a plurality of tone combinations fed through a system as described above with respect to the film sprocket drive means. A selector switch 228 is manually operable for smoothly increasing and decreasing the aperture size of the pupil of the iris means for increasing or decreasing the intensity of the light beam illumination.

The tiltable lens assembly may likewise be controlled by conventional servomotor units (not shown) associated with the rotatable shafts 89, 101 and 114. The servomotor units controlling the rotation of the shafts may be likewise energized by utilizing tone combinations so as to produce manual and recording operation of the tiltable lens assembly.

While control means for varying the light filter means 44 have not been shown, it is understood that a similar control means such as described for the iris diaphragm means and the tiltable lens assembly means may be provided.

The projector means of the present invention thus provides for independent selective movement of a plurality of film strips at least one of which is angularly arranged with respect to the other film strips. Each film strip is controlled so that it may be immobilized to form a basic background stationary pattern upon which patterns of the other moving films may be correlated in rhythm and at varying speeds to produce unusual and unique combinations of color patterns and compositions. The variant speeds of the several film strips cause the pattern formations projected on the screen to produce a multitude of intricate mobile constantly changing designs which may be interwoven or interfused in such a manner by a composer so as to aesthetically create expressions in color and in form.

The effect of the mobile intricate design is further enhanced by modifying the appearance of the designs by selectively varying the intensity of illumination of the projected patterns from each projector means and by the selective distortion of such selected patterns by the tiltable lens assembly. Obviously, various color effects are created when superimposed patterns in color are projected upon the screen.

The angular relation of one of the film strips should be particularly noted because it provides for the relative movement of at least two strips along one path and relative movement of another film strip with respect to the first two film strips along a different path. Thus, movement of patterns not only in mutually opposite directions but in angularly related directions provides for composition of constantly changing new pattern forms in color upon a screen.

Figure 13:
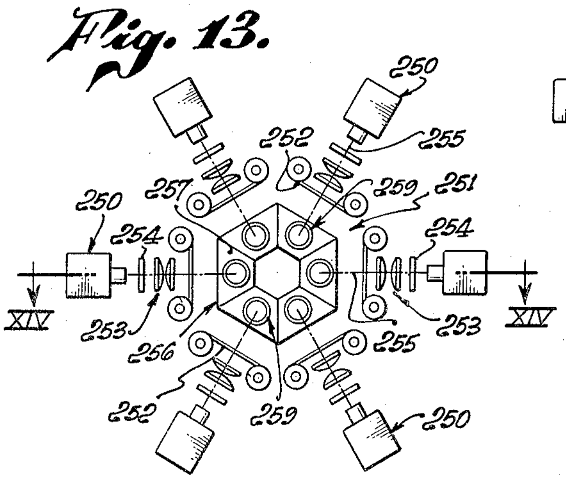
Fig. 13 is a diagrammatic elevational view of a different arrangement of a projector system embodying this invention.
Figure 14:
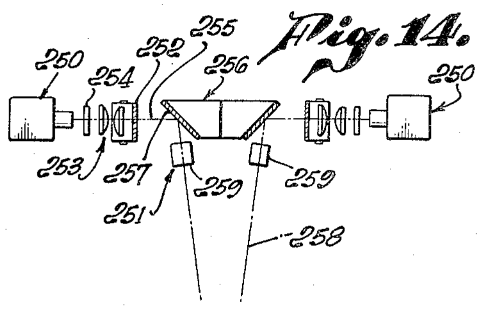
Fig. 14 is a transverse sectional view of the projector system illustrated in Fig. 13, the section being taken in the plane indicated by line XIV—XIV of Fig. 13.

In Figs. 13 and 14 is illustrated a different arrangement of a projector system embodying this invention wherein a plurality of projector means 250 are arranged in radial fashion about a common central zone generally indicated at 251. Each projector means 250 includes a plurality of film strips arranged as described with respect to the projector means 20, only one of said film strips 252 being illustrated for exemplary purposes. The projector means 250 is diagrammatically illustrated as having a condensing lens assembly 253 behind the film strip 252 and an iris diaphragm means 254. The light beam 255 projected by each projector means 250 is reflected from a polyhedral member 256 having flat reflecting surfaces 257 arranged in angularly related converging relationship to a single screen as indicated at 258, Fig. 14. After being reflected from the surfaces 257, the light beam 255 passes through an objective lens system 259 which focuses the image upon the screen 258. It will thus be apparent that a projector system employing the radial arrangement illustrated in Fig. 13 may include virtually any number of projector means desired. Since each projector means may include three or more film strips capable of independent movement, it will be readily understood that an extremely intricate selectively controlled mobile color pattern may be projected upon a single screen.

It is understood that the projector system and the projector means for such a system as contemplated by this invention may be associated with various different types of control means in order to provide for the wide range of relative movement of the film strips, the intensity of illumination of the light beam and the selective distortion of the projected patterns by the tiltable lens assembly.

It is also understood that various modifications and changes may be made in the projector system and the projector means described above which may come within the spirit of this invention, and all such modifications and changes coming within the scope of the appended claims are embraced thereby.

I claim:

1. In a projector means for composing in color and in form, the combination of: a projector frame including a vertical mounting plate and a forwardly extending horizontal platform; a film aperture rearwardly of the platform; light beam projection means rearwardly of the aperture in alignment therewith including a light source, a light limiting means, a condensing lens assembly between the light source and the light limiting means, and a lens between the light limiting means and the aperture; a tiltable lens assembly operably positioned forwardly of the aperture on the platform; color filter means interposed in the path of the light beam, and carried by the frame; a plurality of film strips of selected patterns mounted on the frame and adapted to be moved across said aperture in closely spaced relation thereto one of said film strips being operably mounted on said horizontal platform for movement in angular relation to the movement of the other film strips whereby the selected patterns of the film strips when projected upon a screen interfuse to produce selective new pattern forms.

2. A projector means as claimed in claim 1, wherein said plurality of film strips include two film strips vertically and reciprocally movable in adjacent relation to said aperture and mounted on said vertical plate.

3. A projector means as claimed in claim 1, wherein control means are provided for adjustably regulating the light limiting means to increase or decrease the intensity of illumination of said light beam.

4. A projector means as claimed in claim 1, wherein means are provided for adjustably tilting said tiltable lens assembly for controllably distorting the pattern forms projected on the screen.

5. In a projector system for the aesthetic creation of mobile color forms, the provision of: a plurality of projector means clustered about a common zone; a single screen; a reflector means at said zone for reflecting a projected light beam from each projector means to said screen for superimposition of said beams on said screen; each projector means including a film aperture; light beam projection means behind said aperture including a light source and a light limiting means adjustable to vary the intensity of the light beam; a film strip carried by the projector means adapted to be reciprocally movable along one path in a plane adjacent to said aperture; a second film strip carried by the projector means adapted to be reciprocally movable along a path in a parallel plane and in angular relation to the path of the first film strip; each of said film strips having a selected pattern thereon; color filter means carried by each projector means interposed in the light beam path; driving means for moving each film strip independently at selected rates of speed whereby said patterns are interfused on the screen to produce different selected forms; and means carried by the projector means forwardly of the aperture and in the light beam path for distorting the projected patterns.

6. A projector system as claimed in claim 5, wherein the distorting means includes a plurality of lenses each independently tiltable about its optical axis.

7. In a projector system for the aesthetic creation of mobile color forms, the provision of: a plurality of projector means clustered about a common zone; a single screen; a reflector means at said zone for reflecting a projected light beam from each projector means to said screen for superimposition of said beams on said screen; each projector means including a film aperture; light beam projection means behind said aperture including a light source and a light limiting means adjustable to vary the intensity of the light beam; a film strip carried by the projector means adapted to be selectively reciprocally movable along one path in a plane adjacent to said aperture; a second film strip carried by the projector means adapted to be reciprocally movable along a path in a parallel plane and in angular relation to the path of the first film strip; each of said film strips having a selected pattern thereon; color filter means carried by each projector means interposed in the light beam path; and means for each projector means to drive each film strip independently at a selected rate of speed to interfuse said projected patterns.

8. In a projector system for the aesthetic creation of mobile color forms, the provision of: a plurality of projector means clustered about a common zone; a single screen; a reflector means at said zone for reflecting a projected light beam from each projector means to said screen for superimposition of said beams on said screen; each projector means including a film aperture; light beam projection means behind said aperture including a light source and a light limiting means adjustable to vary the intensity of the light beam; a film strip carried by the projector means adapted to be reciprocally movable along one path in a plane adjacent to said aperture; a second film strip carried by the projector means adapted to be reciprocally movable along a path in a parallel plane and in angular relation to the path of the first film strip; each of said film strips having a selected pattern thereon; a color filter carried by each projector means interposed in the light beam path forwardly of the light limiting means; driving means for moving each film strip independently at selected rates of speed whereby said patterns are interfused on the screen to produce different selected forms.

9. In a projector system for the aesthetic creation of mobile color forms, the provision of: a plurality of projector means clustered about a common zone; a single screen; a reflector means at said zone for reflecting a projected light beam from each projector means to said screen for superimposition of said beams on said screen; each projector means including a film aperture; light beam projection means behind said aperture including a light source and a light limiting means adjustable to vary the intensity of the light beam; a film strip carried by the projector means adapted to be reciprocally movable along one path in a plane adjacent to said aperture; a second film strip carried by the projector means adapted to be reciprocally movable along a path in a parallel plane and in angular relation to the path of the first film strip; said film strips having selected color patterns thereon; driving means for moving each film strip independently at selected rates of speed whereby said patterns are interfused on the screen to produce different selected forms.

10. In an apparatus for composing in color and in form, the combination of: a projector means including an aperture; a light source carried on the means; adjustable light limiting means operably positioned on said projector means between the aperture and light source; a pair of condensing lenses between the light source and the light limiting means; a lens means adjacent to said aperture; a plurality of film strips positioned for movement in spaced planes parallel to the plane of the aperture; at least one of said film strips being movable in angular relation to the other film strips; each film strip having a selected pattern thereon; means to impart color to said projected patterns; means for said projector means to drive each film strip independently at a selected rate of speed; and means on said projector means forwardly of the aperture including a tiltable lens means in the light beam path for distorting projected film patterns.

11. In a system for composing in color and form, the combination of: a screen; a plurality of projector means spaced from said screen; each projector means directing a light beam toward a common zone between said projector means and said screen; each projector means including a plurality of independently movable angularly disposed film strips having selected patterns thereon; means for each projector means to drive each film strip independently at a selected rate of speed; means for imparting color to said patterns when projected; and a reflecting means at said zone for each projected pattern for reflecting said patterns upon said screen whereby said projected patterns interfuse for producing compositions of color and form.

12. In a system for composing in color and form, the combination of: a screen; a plurality of projector means spaced from said screen; each projector means directing a light beam toward a common zone between said projector means and said screen; each projector means including a plurality of independently variably movable angularly disposed film strips each having selected different patterns thereon in color; means for each projector means to drive each film strip independently at a selected rate of speed; and a reflecting means at said zone for each light beam for reflecting the projected different patterns upon said screen for composing said different patterns to create aesthetic effects.

13. In a system for composing in color and form, the combination of: a screen; a plurality of projector means spaced from said screen; each projector means projecting a light beam toward a common zone between said projector means and said screen, each projector means including means to move in a selected direction a film strip having a selected pattern thereon; means to impart color to patterns projected by said projector means; and a reflecting means at said zone for each light beam for reflecting each beam upon said screen in superimposition; the direction and rate of movement of at least one of said film strips being different than the direction and rate of movement of another film strip whereby said projected patterns interfuse and combine to create compositions in color and form.

14. In a system for composing in color and form, the combination of: a screen; a projector means spaced from said screen; said projector means including a plurality of film strips, each disposed at an angle to the other and each provided with a selected pattern; means to impart color to patterns projected from said film strips by said projector means; and means on said projector means to move each film strip in a selected direction and at a selected rate of speed, at least one of said film strips being moved in a different direction and at a different rate of speed than another film strip whereby said patterns on said film strips interfuse and combine to create compositions in color and form.

15. In a projector means for composing in color and in form, the combination of: a projector frame; means providing a film aperture on said frame; light beam projection means supported on said frame in alignment with said aperture and including a light source, and a light limiting means; means to impart color to the light beam projected by the light source and supported by the frame; means to mount a plurality of film strips of selected patterns for movement past said aperture means in angular relation; and means to move each film strip independently at a selected rate of speed whereby the selected patterns of the film strips when projected upon a screen interfuse to produce selective new pattern forms.

References Cited in the file of this patent

UNITED STATES PATENTS

| | | |
|---|---|---|
| 1,129,693 | Kurre | Feb. 23, 1915 |
| 1,406,663 | Lovstrom | Feb. 14, 1922 |
| 1,661,757 | Jones | Mar. 6, 1928 |
| 1,973,454 | Wilfred | Sept. 11, 1934 |
| 2,198,815 | Haskin | Apr. 30, 1940 |